US010913682B2

(12) United States Patent
Singh et al.

(10) Patent No.: US 10,913,682 B2
(45) Date of Patent: Feb. 9, 2021

(54) GLAZING COMPRISING A FUNCTIONAL COATING

(71) Applicant: SAINT-GOBAIN GLASS FRANCE, Courbevoie (FR)

(72) Inventors: Laura Singh, Paris (FR); Rémy Dodet, Gagny (FR)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 0 days.

(21) Appl. No.: 15/758,227

(22) PCT Filed: Sep. 5, 2016

(86) PCT No.: PCT/FR2016/052196
§ 371 (c)(1),
(2) Date: Mar. 7, 2018

(87) PCT Pub. No.: WO2017/042462
PCT Pub. Date: Mar. 16, 2017

(65) Prior Publication Data
US 2018/0244567 A1 Aug. 30, 2018

(30) Foreign Application Priority Data
Sep. 8, 2015 (FR) .................................. 15 58307

(51) Int. Cl.
C03C 17/36 (2006.01)

(52) U.S. Cl.
CPC ............ *C03C 17/366* (2013.01); *C03C 17/36* (2013.01); *C03C 17/3618* (2013.01); *C03C 17/3626* (2013.01); *C03C 17/3639* (2013.01); *C03C 17/3644* (2013.01); *C03C 17/3649* (2013.01); *C03C 17/3652* (2013.01); *C03C 17/3681* (2013.01); *C03C 2217/212* (2013.01); *C03C 2217/256* (2013.01); *C03C 2217/259* (2013.01); *C03C 2217/261* (2013.01); *C03C 2217/281* (2013.01); *C03C 2218/156* (2013.01)

(58) Field of Classification Search
CPC ................................................... C03C 17/36
See application file for complete search history.

(56) References Cited

U.S. PATENT DOCUMENTS

| | | | | |
|---|---|---|---|---|
| 5,563,734 A * | 10/1996 | Wolfe | ..................... | C03C 17/36 204/192.27 |
| 5,948,538 A * | 9/1999 | Brochot | ................... | C03C 17/36 359/359 |
| 6,045,896 A * | 4/2000 | Boire | ..................... | C03C 17/36 204/192.23 |
| 6,060,178 A * | 5/2000 | Krisko | ..................... | C03C 17/36 359/359 |
| 6,287,675 B1 * | 9/2001 | Guiselin | ........... | B32B 17/10174 359/360 |
| 6,413,643 B1 * | 7/2002 | Kunisada | ................ | C03C 17/36 359/360 |
| 6,416,872 B1 * | 7/2002 | Maschwitz | ....... | B32B 17/10174 428/469 |
| 6,602,587 B2 * | 8/2003 | Macquart | .......... | B32B 17/10174 428/216 |
| 6,974,630 B1 * | 12/2005 | Stachowiak | .......... | C03C 17/366 428/432 |
| 7,037,589 B2 * | 5/2006 | Hartig | ..................... | C03C 17/36 428/429 |
| 7,659,002 B2 * | 2/2010 | Coster | ............... | B32B 17/10036 428/432 |
| 8,105,695 B2 * | 1/2012 | Depauw | .................. | C03C 17/36 428/432 |
| 2003/0228471 A1 * | 12/2003 | Hayakawa | .............. | C03C 3/066 428/426 |
| 2006/0246300 A1 * | 11/2006 | Hevesi | .................... | C03C 17/36 428/432 |

FOREIGN PATENT DOCUMENTS

| | | |
|---|---|---|
| EP | 0 678 484 A2 | 10/1995 |
| EP | 0 718 250 A2 | 6/1996 |
| EP | 0 847 965 A1 | 6/1998 |
| EP | 0 912 455 A1 | 5/1999 |
| EP | 0 937 013 A1 | 8/1999 |
| WO | WO 97/48649 A1 | 12/1997 |
| WO | WO 99/05072 | 2/1999 |
| WO | WO 01/21540 A1 | 3/2001 |
| WO | WO 2005/000761 A2 | 1/2005 |
| WO | WO 2009/112759 | 9/2009 |
| WO | WO 2010/072973 A1 | 7/2010 |

OTHER PUBLICATIONS

Hughes—Semicore Equipment—What Is Sputtering Magnetron Sputtering—2014 (Year: 2014).*
Elan Tech—Soda-Lime Glasses Materials & Formulations—Oct. 2019 (Year: 2019).*
Sehgal—low-brittleness glass in soda-lime-silica family—J.Amer. Ceram.Soc.—1998 (Year: 1998).*
International Search Report as issued in International Patent Application No. PCT/FR2016/052196, dated Nov. 7, 2016.

* cited by examiner

*Primary Examiner* — Callie E Shosho
*Assistant Examiner* — John Vincent Lawler
(74) *Attorney, Agent, or Firm* — Pillsbury Winthrop Shaw Pittman LLP

(57) ABSTRACT

A material includes a transparent substrate coated with a stack of thin layers including at least one functional coating including at least one silver-based metal functional layer, and at least one niobium-based metal or nitride functional layer.

24 Claims, No Drawings

GLAZING COMPRISING A FUNCTIONAL COATING

CROSS-REFERENCE TO RELATED APPLICATIONS

This application is the U.S. National Stage of PCT/FR2016/052196, filed Sep. 5, 2016, which in turn claims priority to French patent application number 1558307 filed Sep. 8, 2015. The content of these applications are incorporated herein by reference in their entireties.

The invention relates to a material and to a process for the preparation of a material, such as a glazing, comprising a transparent substrate coated with a stack of thin layers comprising a functional coating which acts on infrared radiation.

A functional coating comprises at least one functional layer. "Functional" layer is understood to mean, within the meaning of the present patent application, the layer(s) of the stack which confer on it most of its thermal properties. The functional layer acts on solar and/or thermal radiation essentially by reflection and/or absorption of the near (solar) or far (thermal) infrared radiation.

These functional coatings are deposited between coatings based on dielectric materials generally comprising several dielectric layers (hereinafter dielectric coatings) which make it possible to adjust the optical properties of the stack. The functional coatings act on the flux of solar radiation passing through said glazing, in contrast to the other, dielectric, coatings, which have the role of chemical or mechanical protection of the functional coating.

Depending on the climates of the countries where these glazings are installed, the desired performance qualities in terms of light transmission and of solar factor can vary within a certain range.

In countries where the levels of exposure to sunlight are high, there exists a strong demand for glazings exhibiting a light transmission (LT) of approximately 50% to 55%, solar factor (g) values of less than 0.47 and a selectivity (s) of greater than 1.0 and better still of greater than 1.1. The light transmission is then sufficiently high for the decrease in the amount of light penetrating inside the space delimited by said glazing not to make it necessary to use artificial light.

According to the invention:
solar factor "g" is understood to mean the ratio of the total energy entering the premises through the glazing to the incident solar energy,
selectivity "s" is understood to mean the ratio of the light transmission to the solar factor LT/g.

The most efficient stacks comprise a silver-based functional layer (or silver layer). These silver layers are of use in several ways: by reflecting the thermal or solar infrared radiation, they give the material low-emissivity or solar-control functions. Electrically conductive, they also make it possible to obtain conductive materials, for example heated glazings or electrodes.

However, these silver layers are highly sensitive to moisture. For this reason, they are used exclusively in double glazings, on face 2 or 3 of the double glazing, the faces of the substrate or substrates being numbered from the outside toward the inside of the building or of the dwelling equipped with said double glazing. Such layers are not in general deposited on single glazings (also referred to as monolithic glazings).

There also exist stacks of thin layers comprising, as functional layers, niobium-based metal or nitride layers, such as are described, for example, in the application WO 01/21540 or in the application WO 2009/112759. Within such layers, the solar radiation comprising the near IR radiation (that is to say, the wavelength of which is between approximately 780 nm and 2500 nm) and the visible radiation (the wavelength of which is between approximately 380 nm and 780 nm) is absorbed nonselectively by the niobium-based functional layer.

The stacks comprising a niobium-based functional layer exhibit the advantage of being cheaper and more resistant than those comprising silver layers. However, insofar as these functional layers absorb the solar radiation nonselectively, the materials comprising them do not exhibit satisfactory optical properties. The absorption and the emissivity are too high and the selectivity too low. In particular, these materials, in general, do not exhibit, for a light transmission of approximately 50% and an emissivity of less than 50%. In this case, the emissivity is of the order of 60%.

Frequently, these materials have to undergo high-temperature heat treatments, intended to improve the properties of the substrate and/or of the stack of thin layers. For example, these can, in the case of glass substrates, be tempering heat treatments intended to mechanically strengthen the substrate. These treatments can modify certain properties of the stack, in particular the energy and optical properties.

Ideally, the materials must be capable of undergoing, once coated with the stack, a heat treatment of the tempering, annealing or bending type, without significant variation in, or at least without damage to, their initial optical and/or energy properties. In particular, after the heat treatment, the materials must retain an acceptable light transmission and exhibit an emissivity which is preferably substantially improved or at the very least substantially unchanged.

The mechanical strength and chemical resistance of these materials comprising complex stacks subjected to high-temperature heat treatments are often insufficient, this being the case, a fortiori, when the functional layers are silver-based metal layers. This low strength and resistance are expressed by the appearance in the short term of defects, such as sites of corrosion, scratches, indeed even the complete or partial tearing off of the stack during its use under standard conditions. All defects or scratches, whether they are due to corrosion, to mechanical stresses or to a poor adhesion between adjacent layers, are liable to detrimentally affect not only the attractiveness of the coated substrate but also its optical and energy performance qualities.

The invention thus consists of the development of novel materials, for the purpose of manufacturing improved solar protection glazings. The improvement targeted is in particular the establishment of a better compromise between the thermal and optical properties while maintaining a high chemical resistance and a high mechanical strength.

More specifically, the material provided with a stack has to exhibit an emissivity coefficient, as defined according to the European standard EN 410, which is sufficiently low, in particular less than 35% or less than 30%, indeed even less than 25%. Such values make it possible to obtain a heat transfer coefficient (Ug) of less than 4 in a single glazing, as defined according to the European standard EN 673.

The material of the invention also has to exhibit, all at the same time, these reinforced thermal insulation properties and a high light transmission, for example a light transmission LT factor of greater than 45%, preferably close to at least 50%, indeed even greater than 50%.

Finally, another aim is to supply a material provided with a stack capable of withstanding the heat treatments without damage, in particular when the substrate carrying the stack is of glass type. This is expressed by an absence of variation in its thermal and optical properties before and after heat treatment, in particular of the tempering type.

The invention relates to a material comprising a transparent substrate coated with a stack of thin layers comprising at least one functional coating comprising:
- at least one silver-based metal functional layer exhibiting a thickness of between 2 and 15 nm,
- optionally at least one blocking layer chosen from metal layers, metal nitride layers, metal oxide layers and metal oxynitride layers of one or more elements chosen from titanium, nickel, chromium and tantalum, such as Ti, TiN, $TiO_x$, Ta, TaN, Ni, NiN, Cr, CrN, NiCr or NiCrN,
- at least one niobium-based metal or nitride functional layer located:
  - in contact with at least a portion of the silver-based functional layer or
  - separated from at least a portion of the silver-based functional layer by one or more layers chosen from blocking layers, the sum of the thicknesses of which is less than 5 nm,
- the sum of the thicknesses of the niobium-based functional layer or layers, located directly in contact with or separated by a thickness of less than 5 nm from at least a portion of the silver-based functional layer, is between 4 and 20 nm.

According to the Invention

"at least one niobium-based metal or nitride functional layer is separated from at least a portion of the silver-based functional layer by one or more layers chosen from blocking layers, the sum of the thicknesses of which is less than 5 nm," means that:
- only blocking layers may be inserted between the niobium-based metal functional layer or layers and the silver-based functional layer or layers of a functional coating and
- the sum of the thicknesses of all the layers capable of being inserted between the niobium-based metal functional layer or layers and the silver-based functional layer or layers of a functional coating is less than 5 nm.

When one or more layers "separates" the niobium-based metal or nitride functional layer and the silver-based functional layer:
- the sum of their thicknesses is less than 5 nm and
- they are chosen from blocking layers.

Preferably, each silver-based metal layer is positioned in contact and between one or more niobium-based metal or nitride functional layers and/or one or more blocking layers.

The invention also relates:
- to the process for the preparation of a material according to the invention,
- to the glazing comprising at least one material according to the invention,
- to the use of a glazing according to the invention as solar control glazing for the building industry or vehicles,
- to a building or a vehicle comprising a glazing according to the invention.

The applicant has discovered, surprisingly, that the use of a functional coating comprising at least two layers, a silver-based layer and a niobium-based layer, makes it possible to obtain an excellent compromise between the optical and thermal properties and the chemical resistance and mechanical strength.

The solution of the invention, by using the combination of a thin silver layer and of a niobium layer, combines the advantages of the stacks comprising a silver-comprising functional layer, in terms of optical and thermal properties, and the advantages of the stacks comprising a niobium-comprising functional layer, in terms of cost but especially of mechanical strength and chemical resistance.

According to the invention, a material exhibiting the following characteristics was able to be obtained, in particular when it is used in a single glazing:
- a light transmission, by increasing order of preference, of greater than or equal to 40%, of greater than or equal to 45%, of greater than or equal to 50%, of between 50% and 55%,
- a solar factor (g) value, by increasing order of preference, of less than 49%, 48%, 47%, 46%, 45%,
- an emissivity of less than or equal to 40%, preferably of less than or equal to 35% or even of less than or equal to 30%, indeed even of less than or equal to 25%,
- a selectivity (s) of greater than 1.0, preferably of greater than 1.1,
- a good chemical and mechanical durability.

The preferred characteristics which appear in the continuation of the description are applicable both to the material according to the invention and, if appropriate, to the process according to the invention.

All the light characteristics presented in the present description are obtained according to the principles and methods described in the European standards EN 410 and EN 673 relating to the determination of the light and solar characteristics of the glazings used in glass for the construction industry.

The stack is deposited by magnetic-field-assisted cathode sputtering (magnetron process). According to this advantageous embodiment, all the layers of the stack are deposited by magnetic-field-assisted cathode sputtering.

Unless otherwise indicated, the thicknesses mentioned in the present document are physical thicknesses and the layers are thin layers. Thin layer is understood to mean a layer exhibiting a thickness of between 0.1 nm and 100 micrometers.

Throughout the description, the substrate according to the invention is regarded as being positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

A silver-based metal functional layer comprises at least 95.0%, preferably at least 96.5% and better still at least 98.0% by weight of silver, with respect to the weight of the functional layer. The silver-based metal functional layer preferably comprises less than 1.0% by weight of metals other than silver, with respect to the weight of the silver-based metal functional layer.

The silver-based metal functional layer can also comprise doping elements chosen, for example, from copper, palladium, gold or platinum. According to the invention, "doping elements" is understood to mean elements not chosen from silver and niobium. Preferably, each of these other, doping elements, represent less than 15%, less than 10%, less than 5%, less than 1%, less than 0.5%, by weight of the functional coating. The maximum proportions of doping element depend on the nature of the doping element.

The silver-based metal functional layer preferably comprises less than 5%, preferably less than 1.0%, indeed even less than 0.5%, by weight of doping elements, with respect to the weight of the silver-based metal functional coating.

The thickness of the silver-based functional layers, corresponding to the sum of the thicknesses of the silver-based functional layers in a functional coating, is, by increasing order of preference, from 2 to 10 nm, from 3 to 8 nm, from 4 to 7 nm, from 3 to 7 nm, from 3 to 6 nm, from 4 to 6 nm.

The functional coating comprises at least one niobium-based metal or nitride functional layer (hereinafter niobium-based functional layer) located:
  in contact with at least a portion of the silver-based functional layer or
  separated from at least a portion of the silver-based functional layer by one or more layers chosen from blocking layers, the sum of the thicknesses of which is less than 5 nm, A niobium-based metal functional layer comprises at least 95.0%, preferably at least 96.5% and better still at least 98.0% by weight of niobium, with respect to the weight of the functional layer. The niobium-based metal functional layer preferably comprises less than 1.0% by weight of metals other than niobium, with respect to the weight of the silver-based metal functional layer.

A niobium-based nitride functional layer comprises at least 95.0%, preferably at least 96.5% and better still at least 98.0% by weight of niobium, with respect to the weight of elements other than nitrogen constituting the niobium-based nitride functional layer. The niobium-based nitride functional layer preferably comprises less than 1.0% by weight of elements other than niobium and nitrogen, with respect to the weight of the niobium-based nitride functional layer.

According to one embodiment, the functional coating comprises at least one niobium-based functional layer located above at least a portion of the silver-based functional layer. This layer exhibits a thickness of between 2 and 10 nm, preferably 2.5 and 8 nm and better still 3 and 5 nm. Advantageously, the niobium-based functional layer is located above and directly in contact with at least a portion of the silver-based functional layer.

According to one embodiment, the functional coating comprises at least one niobium-based functional layer located below at least a portion of the silver-based functional layer. This layer exhibits a thickness of between 1 and 10 nm or between 2 and 10 nm, preferably 1.5 and 5 nm and better still 1.5 and 3 nm. The niobium-based functional layer can be located below and directly in contact with at least a portion of the silver-based functional layer.

The silver-based functional layer can be located between two niobium-based functional layers. The sum of the thicknesses of the niobium-based functional layers, located directly in contact with or separated by a thickness of less than 5 nm from at least a portion of the silver-based functional layer, is between 3 and 10 nm, between 4 and 8 nm, between 5 and 7 nm.

The ratio of the sum of the thicknesses of the niobium-based functional layers to the sum of the thicknesses of the silver-based metal functional layers of one and the same functional coating is, by increasing order of preference:
  greater than 0.9, greater than 1.0, greater than 1.1, greater than 1.2,
  between 1.0 and 4.0, between 1.0 and 2.0.

The niobium-based functional layers can also be separated from at least a portion of the silver-based functional layer by one or more blocking layers, the sum of the thicknesses of which is, by increasing order of preference, less than 5 nm, less than 4 nm, less than 3 nm, less than 2 nm, less than 1 nm.

According to the invention, it is considered that the blocking layer or layers located in contact with the silver-based metal functional layers and/or with the niobium-based metal or nitride functional layers of one and the same functional coating belong to the functional coating.

These blocking layers are chosen from metal layers, metal nitride layers, metal oxide layers and metal oxynitride layers of one or more elements chosen from titanium, nickel, chromium and tantalum, such as Ti, TiN, $TiO_x$, Ta, TaN, Ni, NiN, Cr, CrN, NiCr or NiCrN. When these blocking layers are deposited in the metal, nitride or oxynitride form, these layers can undergo a partial or complete oxidation according to their thickness and the nature of the layers which frame them, for example, during the deposition of the following layer or by oxidation in contact with the underlying layer.

According to different embodiments, the functional coating comprises:
  a blocking layer located below and/or above a silver-based metal functional layer, preferably in contact with said silver-based metal functional layer, and/or
  a blocking layer located below and/or above a niobium-based metal or nitride functional layer, preferably in contact with said niobium-based functional layer.

According to an advantageous embodiment, the functional coating begins and/or ends with a blocking layer, preferably chosen from metal layers, in particular of a nickel and chromium (NiCr) alloy. The functional coating "begins with a blocking layer" means that the first layer of the functional coating, with respect to the substrate, is a blocking layer. The functional coating "ends with a blocking layer" means that the last layer of the functional coating, with respect to the substrate, is a blocking layer.

The thickness of a blocking layer is preferably:
  at least 0.2 nm, at least 0.5 nm or at least 0.8 nm, and/or
  at most 5.0 nm or at most 2.0 nm.

The functional coatings are deposited between dielectric coatings. According to this embodiment, the stack of thin layers comprises at least one functional coating and at least two dielectric coatings comprising at least one dielectric layer, so that each functional coating is positioned between two dielectric coatings.

The functional coatings exhibit, by increasing order of preference, a thickness of between 5 and 20 nm, 8 and 15 nm, 10 and 13 nm.

The stack of thin layers can comprise just one functional coating. The stack is located on at least one of the faces of the transparent substrate.

An example of a stack suitable according to the invention comprises:
  a dielectric coating located below the functional coating,
  a functional coating,
  a dielectric coating located above the functional coating,
  optionally a protective layer.

The dielectric coatings exhibit a thickness of greater than 15 nm, preferably of between 15 and 100 nm, 20 and 70 nm and better still between 30 and 60 nm.

The dielectric layers of the dielectric coatings exhibit the following characteristics, alone or in combination:
  they are deposited by magnetic-field-assisted cathode sputtering,
  they are chosen from the oxides or nitrides of one or more elements chosen from titanium, silicon, aluminum, zirconium, tin and zinc, they have a thickness of greater than 2 nm, preferably of between 2 and 100 nm.

Preferably, the dielectric layers exhibit a barrier function. Dielectric layers having a barrier function (hereinafter barrier layer) is understood to mean a layer made of a material capable of forming a barrier to the diffusion of oxygen and water at high temperature, originating from the ambient atmosphere or from the transparent substrate, toward the functional layer. The barrier layers can be based on silicon and/or aluminum compounds chosen from oxides, such as $SiO_2$, nitrides, such as silicon nitride $Si_3N_4$ and aluminum nitrides AlN, and oxynitrides $SiO_xN_y$, optionally doped using at least one other element. The barrier layers can also be based on zinc tin oxide.

According to one embodiment, the stack of thin layers comprises at least one dielectric coating comprising at least one dielectric layer consisting of a nitride or of an oxynitride of aluminum and/or of silicon or of a mixed zinc tin oxide, preferably with a thickness of between 20 and 70 nm.

The stack can in particular comprise a dielectric layer based on silicon and/or aluminum nitride located below and/or above at least a portion of the functional coating. The dielectric layer based on silicon and/or aluminum nitride has a thickness:
- of less than or equal to 100 nm, of less than or equal to 80 nm or of less than or equal to 60 nm, and/or
- of greater than or equal to 15 nm, of greater than or equal to 20 nm or of greater than or equal to 30 nm.

The dielectric coating or coatings located below a functional coating can comprise just one layer consisting of a nitride or of an oxynitride of aluminum and/or of silicon, with a thickness of between 30 and 70 nm, preferably of a layer consisting of silicon nitride, optionally additionally comprising aluminum.

The dielectric coating or coatings located above a functional coating can comprise:
- at least layer consisting of a nitride or of an oxynitride of aluminum and/or of silicon, with a thickness of between 30 and 60 nm, preferably of a layer consisting of silicon nitride, optionally additionally comprising aluminum,
- optionally at least one protective layer with a thickness of between 2 and 10 nm.

The stack of thin layers can optionally comprise a protective layer. The protective layer is preferably the final layer of the stack, that is to say the layer furthest from the substrate coated with the stack (before heat treatment). These layers generally have a thickness of between 2 and 10 nm, preferably 2 and 5 nm. This protective layer can be chosen from a layer of titanium, of zirconium, of hafnium, of silicon, of zinc and/or of tin, this or these metals being in the metal, oxide or nitride form.

According to one embodiment, the protective layer is based on zirconium and/or titanium oxide, preferably based on zirconium oxide or on titanium zirconium oxide.

By way of illustration, the stacks can comprise functional coatings comprising the following sequences of layers:
Nb/Ag/Nb.
NiCr/Ag/Nb.
Nb/Ag/NiCr.
NiCr/Nb/Ag/Nb.
NiCr/Nb/Ag/NiCr.
NiCr/Ag/NiCr/Nb.
NiCr/Ag/Nb/NiCr.
Nb/NiCr/Ag/NiCr.
Nb/NiCr/Ag/Nb.
Nb/Ag/NiCr/Nb.
Nb/Ag/Nb/NiCr.
NiCr/Nb/NiCr/Ag/Nb.
NiCr/Nb/NiCr/Ag/NiCr.
NiCr/Nb/Ag/NiCr/Nb.
NiCr/Nb/Ag/Nb/NiCr.
NiCr/Ag/NiCr/Nb/NiCr.
Nb/NiCr/Ag/NiCr/Nb.
Nb/NiCr/Ag/Nb/NiCr.
Nb/Ag/NiCr/Nb/NiCr.
NiCr/Nb/NiCr/Ag/NiCr/Nb.
NiCr/Nb/NiCr/Ag/Nb/NiCr.
NiCr/Nb/Ag/NiCr/Nb/NiCr.
Nb/NiCr/Ag/NiCr/Nb/NiCr.
NiCr/Nb/NiCr/Ag/NiCr/Nb/NiCr.
with:
Ag corresponding to a silver-based metal functional layer,
Nb corresponding to a niobium-based or metal functional layer,
NiCr corresponding to a metal layer based on nickel and/or on chromium.

The first layer mentioned corresponds to the layer of the functional coating closest to the substrate and the last layer corresponds to the layer of the functional coating furthest from the substrate. The layers of these sequences are preferably directly in contact.

According to one embodiment, the invention relates to a material comprising a transparent substrate coated with a stack of thin layers comprising at least one functional coating comprising:
- at least one silver-based metal functional layer exhibiting a thickness of between 2 and 15 nm, preferably from 2 to 6 nm,
- optionally at least one blocking layer chosen from metal layers, metal nitride layers, metal oxide layers and metal oxynitride layers of one or more elements chosen from titanium, nickel, chromium and tantalum, such as Ti, TiN, $TiO_x$, Ta, TaN, Ni, NiN, Cr, CrN, NiCr or NiCrN,
- at least one niobium-based metal or nitride functional layer located:
  - in contact with at least a portion of the silver-based functional layer or
  - separated from at least a portion of the silver-based functional layer by one or more layers chosen from blocking layers, the sum of the thicknesses of which is less than 5 nm,
- preferably, each silver-based metal layer is positioned in contact and between one or more niobium-based metal or nitride functional layers and/or one or more blocking layers,
- the sum of the thicknesses of the niobium-based functional layer or layers, located directly in contact with or separated by a thickness of less than 5 nm from at least a portion of the silver-based functional layer, is between 3 and 20 nm.

The transparent substrates according to the invention are preferably made of a rigid inorganic material, such as made of glass, or are organic, based on polymers (or made of polymer).

The transparent organic substrates according to the invention, which are rigid or flexible, can also be made of polymer. Examples of polymers suitable according to the invention comprise, in particular:
polyethylene;
polyesters, such as polyethylene terephthalate (PET), polybutylene terephthalate (PBT) or polyethylene naphthalate (PEN);

polyacrylates, such as polymethyl methacrylate (PMMA);
polycarbonates;
polyurethanes;
polyamides;
polyimides;
fluoropolymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
photocrosslinkable and/or photopolymerizable resins, such as thiolene, polyurethane, urethane-acrylate or polyester-acrylate resins; and
polythiourethanes.

The substrate is preferably a sheet of glass or of glass-ceramic.

The substrate is preferably transparent, colorless (it is then a clear or extra-clear glass) or colored, for example blue, gray or bronze. The glass is preferably of soda-lime-silica type but it can also be a glass of borosilicate or alumino-borosilicate type.

The substrate advantageously has at least one dimension greater than or equal to 1 m, indeed even 2 m and even 3 m. The thickness of the substrate generally varies between 0.5 mm and 19 mm, preferably between 0.7 and 9 mm, in particular between 2 and 8 mm, indeed even between 4 and 6 mm. The substrate can be flat or bent, indeed even flexible.

The material, that is to say the transparent substrate coated with the stack, is intended to undergo a high-temperature heat treatment chosen from an annealing, for example by a flash annealing, such as a laser or flame annealing, a tempering and/or a bending. The temperature of the heat treatment is greater than 400° C., preferably greater than 450° C. and better still greater than 500° C. The substrate coated with the stack can thus be bent and/or tempered.

The invention also relates to a process for the preparation of a material comprising a transparent substrate coated with a stack of thin layers deposited by cathode sputtering, optionally magnetic-field-assisted cathode sputtering, the process comprises the sequence of following stages:
at least one functional coating comprising at least one silver-based functional layer exhibiting a thickness of between 2 and 10 nm and at least one niobium-based functional layer exhibiting a thickness of between 2 and 10 nm, located below and/or above and in contact with at least a portion of the silver-based functional layer, is deposited on the transparent substrate, then
a coating based on dielectric materials is deposited above the functional layer,
the substrate thus coated is subjected to a heat treatment.

This heat treatment can be carried out at a temperature of greater than 200° C., of greater than 300° C. or of greater than 400° C., preferably of greater than 500° C.

The heat treatment is preferably chosen from tempering, annealing and rapid annealing treatments.

The tempering or annealing treatment is generally carried out in an oven, respectively a tempering or annealing oven. The whole of the material, thus including the substrate, can be brought to a high temperature of at least 300° C., in the case of the annealing, and of at least 500° C., indeed even 600° C., in the case of a tempering.

The invention also relates to a glazing comprising at least one material according to the invention.

The material or the glazing can be in the form of a monolithic glazing or single glazing, of a laminated glazing or of a multiple glazing, in particular a double glazing or a triple glazing. The invention thus also relates to a transparent glazing comprising at least one material according to the invention. These materials are preferably glazings fitted to a building or a vehicle.

The stack is positioned in the glazing so that the incident light originating from the outside passes through the first dielectric coating before passing through the first metal functional layer.

In the case of a monolithic or multiple glazing, the stack is preferably deposited on face 2, that is to say that it is found on the interior face of a substrate.

A monolithic glazing comprises 2 faces; the face 1 is outside the building and thus constitutes the exterior wall of the glazing and the face 2 is inside the building and thus constitutes the interior wall of the glazing.

A double glazing comprises 4 faces; the face 1 is outside the building and thus constitutes the exterior wall of the glazing and the face 4 is inside the building and thus constitutes the interior wall of the glazing, the faces 2 and 3 being inside the double glazing. However, the stack can also be deposited on face 4.

The examples which follow illustrate the invention without, however, limiting it.

EXAMPLES

Stacks of thin layers defined below are deposited on substrates made of clear soda-lime glass.

The stacks are deposited, in a known way, on a cathode sputtering line (magnetron process) in which the substrate progresses forward under different targets.

For these examples, the conditions for deposition of the layers deposited by sputtering ("magnetron cathode" sputtering) are summarized in the table below.

TABLE 1

| | Targets employed | Deposition pressure | Gas | Index* |
|---|---|---|---|---|
| $Si_3N_4$ | Si:Al (92:8% by wt) | $2\text{-}10*10^{-3}$ mbar | Ar: 30-80% - $N_2$: 20-70% | 2.00 |
| NiCr | Ni:Cr (80:20 at. %) | $1\text{-}5*10^{-3}$ mbar | 100% Ar | — |
| Ag | Ag | $2\text{-}3*10^{-3}$ mbar | 100% Ar | — |
| Nb | Nb | $5\text{-}10*10^{-3}$ mbar | 100% Ar | — |
| $TiO_2$ | $TiO_x$ | $1.5*10^{-3}$ mbar | 88% Ar - 12% $O_2$ | 2.32 | at.: atomic; wt: weight;
*at 550 nm.

Table 2 lists the materials and the physical thicknesses in nm of each layer or coating which forms the stacks of MA and MB type as a function of their position with regard to the substrate carrying the stack (final line at the bottom of the table). The thicknesses given correspond to the thicknesses before tempering.

TABLE 2

| | MA | MB |
|---|---|---|
| Dielectric coating | | |
| $TiO_x$ | 9 nm | 9 nm |
| $Si_3N_4$ | 37 nm | 37 nm |
| Functional coating | cf. Tab. 3 | cf. Tab. 3 |

TABLE 2-continued

|  | MA | MB |
|---|---|---|
| Dielectric coating | | |
| Si$_3$N$_4$ | 55 nm | 55 nm |
| Substrate: Glass | 4 mm | 4 mm |

The materials of examples MA1 to MA3 and MB1 to MB4 respectively comprise the stacks of MA and MB type are two different series of tests. The stacks of these series which differ in the nature of the functional coating. The functional coatings comprise a sequence of the several layers defined in table 3. The first layer mentioned corresponds to the layer of the functional coating closest to the substrate. The thicknesses given in this table are physical thicknesses in nanometers.

TABLE 3

|  | Functional coating (nm) | Tot. Thick. | | | Nb/Ag |
|---|---|---|---|---|---|
|  |  | Ag | Nb | FC |  |
| MA1 | Nb (2.3)/Ag (6)/Nb (4.2) | 6 | 6.5 | 12.5 | 1.08 |
| MA2 | Nb (2.3)/Ag (5)/Nb (4.5) | 5 | 6.8 | 11.8 | 1.36 |
| MA3 | Nb (2.3)/Ag (4.5)/Nb (4.7) | 4.5 | 7 | 11.5 | 1.56 |
| MB1 | Nb (2.3)/Ag (5)/Nb (4.5) | 5 | 6.8 | 11.8 | 1.36 |
| MB2 | Nb (1.5)/NiCr (0.7)/Ag (5)/NiCr (0.7)/Nb (3.8) | 5 | 5.3 | 11.7 | 1.06 |
| MB3 | Nb (1.4)/NiCr (0.9)/Ag (5)/NiCr (0.9)/Nb (3.6) | 5 | 5 | 11.8 | 1 |
| MB4 | NiCr (2.3)/Ag (5)/NiCr (4.5) | 5 | 0 | 11.8 | 0 |

I. "Solar Control" and Colorimetry Performance Qualities

The main optical characteristics measured when the materials MA1 to MA3 are fitted in a single glazing, the stack being positioned on face 2, the face 1 of the glazing being the outermost face of the glazing, as usual, are listed in table 4.

For these glazings:
LT indicates the light transmission in the visible region in %, measured according to the illuminant D65 at 2° Observer;
LRe indicates: the light reflection in the visible region in %, measured according to the illuminant D65 at 2° Observer on the side of the outermost face, the face 1;
a*Re and b*Re indicate the colors in reflection a* and b* in the L*a*b* system, measured according to the illuminant D65 at 2° Observer on the side of the outermost face and measured thus perpendicularly to the glazing;
LRi indicates the light reflection in the visible region in %, measured according to the illuminant D65 at 2° Observer on the side of the interior face, the face 2;
a*Ri and b*Ri indicate the colors in reflection a* and b* in the L*a*b* system, measured according to the illuminant D65 at 2° Observer on the side of the interior face and measured thus perpendicularly to the glazing;
Abs. indicates the absorbance in the visible region in % corresponds to (100–LT %–LRi %) measured according to the illuminant D65 at 2° Observer.

These characteristics are measured for the glazing provided with the stack first at the outlet of the magnetron line and then after a heat treatment of tempering type consisting in particular of an annealing at 650° C. for 10 minutes.

The relative variations in each characteristic attributable to the heat treatment are also specified in table 4. For example, the variation in the light transmission was calculated in the following way: ΔLT=(LT % after HT–LT % before HT)/(LT % before HT)×100 with HT meaning heat treatment.

TABLE 4

|  | HT | Int. reflection | | | Ext. reflection | | | Abs. | LT | Δ LT | Δ LRi | Δ LRe | Δ Abs |
|---|---|---|---|---|---|---|---|---|---|---|---|---|---|
|  |  | LRi | a*Ri | b*Ri | LRe | a*Re | b*Re |  |  |  |  |  |  |
| MA1 | Before | 3.8 | 26.1 | −19.4 | 15.2 | 2.3 | −16.4 | 43.3 | 53.0 | 4 | 5 | 8 | 1 |
|  | After | 4 | 24.7 | −14.4 | 16.4 | 1.7 | −13.9 | 43.9 | 50.8 |  |  |  |  |
| MA2 | Before | 3.9 | 26 | −16.9 | 15.4 | 2.3 | −15.8 | 43.3 | 52.8 | 3 | 5 | 8 | 4 |
|  | After | 4.1 | 24.9 | −13.1 | 16.7 | 1.7 | −12.7 | 44.9 | 51.0 |  |  |  |  |
| MA3 | Before | 4.8 | 22.1 | −5.7 | 15 | 2.8 | −15.1 | 43.3 | 51.9 | 2 | 4 | 7 | 1 |
|  | After | 5 | 20.3 | −1 | 16 | 2.1 | −11.8 | 43.9 | 51.1 |  |  |  |  |

Table 5 is concerned with the performance qualities of the materials and shows the relative variations in emissivity attributable to the heat treatment. The variation in emissivity was calculated in the following way: Δε=(ε after HT–ε before HT)/(ε before HT)×100.

TABLE 5

|  |  | Performance qualities | | | | |
|---|---|---|---|---|---|---|
|  | HT | g | s | ε | Ug | Δε |
| MA1 | Before | 46.8 | 1.13 | 22.5 | 3.9 | 5 |
|  | After | 48.1 | 1.10 | 21.3 | 3.9 |  |
| MA2 | Before | 47.4 | 1.11 | 28.5 | 4.1 | 1 |
|  | After | 46.7 | 1.09 | 28.1 | 4.1 |  |
| MA3 | Before | 47.2 | 1.10 | 32.2 | 4.3 | 0 |
|  | After | 47.4 | 1.08 | 32.3 | 4.3 |  |

"g": solar factor in %;
"s": selectivity;
"ε": emissivity in %;
"Ug": heat transfer coefficient.

According to the invention, the functional coating according to the invention makes it possible to obtain a relatively high value for the light transmission of the substrate, while retaining a significant insulating effect, despite the very low thickness of the silver-based metal functional layer, after a heat treatment.

The examples show that the materials according to the invention exhibit a very good compromise between the light transmission LT, the solar factor and the emissivity. It is clearly apparent that its very good initial properties are completely undamaged when the glazing is subjected to the heat treatment.

The solution of the invention makes it possible to obtain a stability of the characteristics of the glazing before and after the heat treatment. The materials thus exhibit a noteworthy stability of the optical and colorimetric characteristics before and after the heat treatment.

The materials according to the invention exhibit in particular an emissivity coefficient which is sufficiently low, in particular of less than 35%, indeed even of less than 25%. Furthermore, after the heat treatment, the materials according to invention exhibit an emissivity which is preferably substantially improved or at the very least substantially unchanged.

II. Tests of Resistance to Aging and to Abrasion

Tests according to the standard EN 1096 for evaluating the resistance of the stack of thin layers to weathering and to abrasion were carried out and in particular:
- the test of resistance to acid attacks (Annex C of the standard), known as $SO_2$ test,
- the test of resistance to neutral salt spray (Annex D of the standard), known as NSS test,
- the test of resistance to neutral condensation (Annex B of the standard), known as high humidity (HH) test,
- the test of resistance to abrasion, also known as Taber test.

An Erichsen brush test was also carried out.

An analysis by optical microscopy after some tests was carried out. It makes it possible to demonstrate the presence of defects. The following assessments were reported after microscopic observation:

"−": presence of many pits,
"0": presence of a few pits,
"+": virtually no pits.

The following devices were used:
Minolta No. ISO 1325,
$SO_2$ chamber No. ISO 1038,
Perkin-Elmer No. ISO 1043, Mirror W1 No. 1066,
Neutral salt spray (NSS) chamber No. ISO 981,
High humidity (HH) chamber,
Light booth No. ISO 732,
Microscope No. ISO 185.

The size of the samples is 10×10 cm. Unless otherwise indicated, the measurements were carried out after heat treatment as defined above.

II.1. TESTS ON THE MATERIALS OF MA TYPE a. $SO_2$ Test

TABLE 6

| | Cycles | ΔE layer BT | ΔE layer AT | ∈ BT | ∈ AT |
|---|---|---|---|---|---|
| MA1 | 0 | — | — | 23.67 | 22.73 |
| | 15 | 0.33 | 1.77 | 24.10 | 22.86 |
| | 25 | 3.49 | 2.67 | 24.64 | 22.71 |
| MA3 | 0 | — | — | 33.01 | 33.82 |
| | 15 | 0.69 | 0.24 | 33.34 | 33.83 |
| | 25 | 3.21 | 1.09 | 33.41 | 33.77 |
| | 45 | 1.87 | 0.94 | 33.51 | 33.91 |

BT: Before HT, AT: After HT.

TABLE 7

| | Cycles | Light booth BT | Light booth AT | Optical microscope BT | Optical microscope AT |
|---|---|---|---|---|---|
| MA1 | 25 | NOK | OK | − | + |
| MA3 | 25 | OK | OK | + | + |
| | 45 | OK | OK | + | + |

The materials MA1 after heat treatment and MA3 before and after heat treatment are satisfactory. The example MA1 before heat treatment (BT) is not satisfactory after 25 cycles. The emissivity increases, the visual appearance in the light booth and the photographs with the optical microscope are not acceptable.

b. High Humidity (HH) Test

In order to evaluate the chemical resistance of the stack, an accelerated aging test, referred to as test of resistance to high humidity, was carried out. This test consists in placing a material in a drying oven heated at 120° C. for 480 minutes exhibiting a relative humidity of 100%. The visual observation of the material according to the invention after heat treatment makes it possible to note the absence of haze. The materials MA1 after heat treatment and MA3 before and after heat treatment are not damaged after having been subjected to the HH test for 56 days. Only the material MA1 before heat treatment BT is damaged when it is observed in the light booth.

c. Test of Resistance to Neutral Salt Spray (NSS)

The materials MA1 to MA3 are not damaged after having been subjected to the NSS test for 56 days. MA1 before heat treatment BT is damaged when it is observed in the light booth. Only a few sites of corrosion are observed on MA1 after heat treatment.

d. Test of Resistance to Abrasion

The test of resistance to abrasion was carried out with a load of 500 g for 500 cycles. The LT and the Haze are given in %.

TABLE 8

| | HT | Initial LT | Initial Haze | 500 cycles LT | 500 cycles Haze | Δ LT | Δ Haze |
|---|---|---|---|---|---|---|---|
| MA3 | Before | 49.5 | 0.07 | 54.4 | 5.64 | 4.9 | 5.57 |
| MA3 | After | 49.7 | 0.04 | 51 | 4.1 | 1.3 | 4.06 |

The material MA3 is satisfactory. The results are acceptable with variations in light transmission of less than 5% for the abrasion test before and after heat treatment.

e. Erichsen Brush Test (EBT)

The materials MA1 to MA3 were subjected to the Erichsen brush test (EBT), for 1000 cycles, before (EBT) and after tempering (HTEBT). This test consists in rubbing the stack using a brush having hairs made of polymer material, the stack been covered with water. A glazing is regarded as satisfying the test if no mark is visible to the naked eye. The materials MA1 to MA3 satisfy the test before and after heat treatment.

II.2. TESTS ON MATERIALS OF MB TYPE

TABLE 9

| | $SO_2$ | ΔEi | ΔEe | ∈ |
|---|---|---|---|---|
| MB1 | initial | 4.19 | 0.31 | 26.7 |
| | 35 cy. | | | 26.7 |
| MB2 | initial | 0.91 | 0.11 | 26.7 |
| | 35 cy. | | | 26.8 |

TABLE 9-continued

|     | SO$_2$ | ΔEi | ΔEe | ∈ |
|-----|--------|-----|-----|------|
| MB3 | initial | 1.04 | 0.11 | 26.9 |
|     | 35 cy. |     |     | 26.9 |
| MB4 | initial | 15.68 | 3.86 | 25.7 |
|     | 15 cy. |     |     | 35.6 | a. SO$_2$ Test

TABLE 10

|     | SO$_2$ | Light booth | Microscope |
|-----|--------|-------------|------------|
| MB1 | 35 cy. | OK | 0 |
| MB2 | 35 cy. | OK | 0 |
| MB3 | 35 cy. | OK | 0 |
| MB4 | 15 cy. | NOK | — |

The examples MB1 to MB3 are satisfactory, in contrast to the comparative example MB4, which is not satisfactory. The example MB4 does not comprise a niobium-comprising layer but only blocking layers. This is because the ΔEi of the example MB4 is much too high (>5). Furthermore, the emissivity has also excessively increased (more than 2 points).

b. NSS Test

TABLE 11

|     | NSS (days) | ΔEi | ΔEe | ∈ |
|-----|------------|-----|-----|------|
| MB1 | initial | 0.87 | 0.19 | 26.3 |
|     | 42 |     |     | 26.3 |
| MB2 | initial | 2.81 | 0.15 | 26.7 |
|     | 42 |     |     | 26.8 |
| MB3 | initial | 1.66 | 0.23 | 26.8 |
|     | 42 |     |     | 27 |
| MB4 | initial | 13.18 | 5.06 | 26.3 |
|     | 14 |     |     | 34.1 |

TABLE 12

|     | Light booth | Microscope |
|-----|-------------|------------|
| MB1 | Ok | + |
| MB2 | Ok | + |
| MB3 | Ok | + |
| MB4 | NOk | - |

The examples MB1 to MB3 are satisfactory, in contrast to the comparative example MB4, which is not satisfactory. This is because the ΔE of the example MB4 is much too high (>5). Furthermore, the emissivity has also excessively increased (more than 2 points).

c. High Humidity (HH) Test

TABLE 10

|     | HH (days) | ΔEi | ΔEe | ∈ |
|-----|-----------|-----|-----|------|
| MB1 | initial | 1.29 | 0.10 | 26.3 |
|     | 42 |     |     | 26.3 |
| MB2 | initial | 1.71 | 0.19 | 26 |
|     | 42 |     |     | 26 |
| MB3 | initial | 3.30 | 0.09 | 26.9 |
|     | 42 |     |     | 26.4 |
| MB4 | initial | 0.42 | 0.25 | 26.8 |
|     | 42 |     |     | 28.8 |

TABLE 11

|     | Light booth | Microscope |
|-----|-------------|------------|
| MB1 | OK | + |
| MB2 | OK | + |
| MB3 | OK | + |
| MB4 | OK | + |

The examples MB1 to MB3 are satisfactory, in contrast to the comparative example MB4, which is not satisfactory. This is because the emissivity of the example MB4 has excessively increased (2 points).

d. Test of Resistance to Abrasion

TABLE 13

| | Resistance to abrasion after heat treatment | | | | | |
|---|---|---|---|---|---|---|
| | Initial | | 500 cycles | | Δ (500 cycles) | |
| | LT | Haze | LT | Haze | ΔLT | ΔHaze |
| MB1 | 51.3 | 0.3 | 60.8 | 3.61 | 9.50 | 3.31 |
| MB2 | 51.9 | 0.41 | 57.5 | 3.92 | 5.60 | 3.51 |
| MB3 | 52.2 | 0.44 | 59.0 | 3.74 | 6.80 | 3.30 |
| MB4 | 59.4 | 0.35 | 76.8 | 3.10 | 17.40 | 2.75 |

The examples MB2 and MB3 with a blocking layer exhibit the best results with in particular a much lower variation in light transmission.

II.3. CONCLUSION

The functional coatings comprising a silver layer bounded by two niobium-based layers with optionally one or more blocking layers are preferred.

The presence of a thin blocking layer above and/or below the silver layer gives good results in terms of abrasion resistance.

The best results are obtained when the thickness of the silver-based functional layers in a functional coating is, by increasing order of preference, less than 6 nm, from 3 to 6 nm, from 4 to 5.5 nm. For this, the results obtained with the materials MA1 and MA3 may be compared.

The invention claimed is:

1. A material comprising a transparent substrate coated with a stack of thin layers comprising at least one functional coating comprising:
    a silver-based metal functional layer exhibiting a thickness of between 2 and 6 nm,
    optionally at least one blocking layer chosen from metal layers, metal nitride layers, metal oxide layers and metal oxynitride layers of one or more elements chosen from titanium, nickel, chromium and tantalum,
    a first and second niobium-based functional layers each selected from a niobium-based metal functional layer or from a niobium-based nitride functional layer and each located:
        in contact with at least a portion of the silver-based functional layer or
        separated from at least a portion of the silver-based functional layer by one or more blocking layers, a sum of thicknesses of the one or more blocking layers is less than 5 nm, the silver-based metal functional layer arranged between the first and second niobium-based functional layers,
    a sum of thicknesses of the first and second niobium-based functional layers, located directly in contact with or separated by a thickness of less than 5 nm from at least a portion of the silver-based functional layer, is between 4 and 20 nm, wherein the niobium-based metal functional layer comprises at least 95.0% by weight of niobium with respect to the weight of the niobium-based metal functional layer and the niobium-based nitride functional layer comprises at least 95% by weight of niobium, with respect to the weight of elements other than nitrogen constituting the niobium-based nitride functional layer, wherein the sum of thicknesses of the first and second niobium-based functional layers is greater than the thickness of the silver-based metal functional layer and the thickness of the second niobium-based functional layer is greater than the thickness of the first niobium-based functional layer, the first niobium-based functional layer being arranged closer to the transparent substrate than the second niobium-based functional layer, and wherein a ratio of the sum of the thicknesses of the first and second niobium-based functional layers to the sum of the thickness of the silver-based metal functional layer of the functional coating is greater than 1 and lower than 4.

2. The material as claimed in claim 1, wherein the second niobium-based functional layer has a thickness of between 3.6 and 10 nm.

3. The material as claimed in claim 1, wherein the first niobium-based functional layer has a thickness of between 1.4 and 3 nm.

4. The material as claimed in claim 1, wherein the at least one functional coating comprises a blocking layer located below and/or above the silver-based metal functional layer.

5. The material as claimed in claim 1, wherein the thickness of one of the one or more blocking layers is at least 0.2 nm and at most 5.0 nm.

6. The material as claimed in claim 1, wherein the functional coating exhibits a thickness of between 6 and 20 nm.

7. The material as claimed in claim 1, wherein the stack of thin layers comprises at least one functional coating and at least two dielectric coatings comprising at least one dielectric layer, so that each functional coating is positioned between two dielectric coatings.

8. The material as claimed in claim 1, wherein the stack of thin layers comprises only one functional coating.

9. The material as claimed in claim 1, wherein the stack of thin layers comprises at least one dielectric coating comprising at least one dielectric layer consisting of a nitride or of an oxynitride of aluminum and/or of silicon or of a mixed zinc tin oxide.

10. The material as claimed in claim 9, wherein a thickness of the at least one dielectric layer is between 20 and 70 nm.

11. The material as claimed in claim 1, wherein the stack of thin layers comprises at least one dielectric coating located below the functional coating, the at least one dielectric coating comprising only one layer consisting of a nitride or of an oxynitride of aluminum and/or of silicon, with a thickness of between 30 and 70 nm.

12. The material as claimed in claim 11, wherein the layer consisting of a nitride or of an oxynitride of aluminum and/or of silicon is a layer consisting of silicon nitride, and optionally additionally aluminum.

13. The material as claimed in claim 1, wherein the stack of thin layers comprises at least one dielectric coating located above the at least one functional coating, the at least one dielectric coating comprising:

at least one layer consisting of a nitride or of an oxynitride of aluminum and/or of silicon, with a thickness of between 30 and 60 nm, optionally at least one protective layer with a thickness of between 2 and 10 nm.

14. The material as claimed in claim 13, wherein the layer consisting of a nitride or of an oxynitride of aluminum and/or of silicon is a layer consisting of silicon nitride, and optionally additionally aluminum.

15. The material as claimed in claim 1, wherein the transparent substrate is:
made of glass, or
made of polymer.

16. The material as claimed in claim 15, wherein the transparent substrate is sodium-lime-silica glass, polyethylene, polyethylene terephthalate, or polyethylene naphthalate.

17. A glazing comprising at least one material as claimed in claim 1.

18. The glazing as claimed in claim 17, wherein the glazing is in the form of a monolithic, laminated or multiple glazing.

19. The material as claimed in claim 1, wherein the optional at least one blocking layer is selected from the group consisting of Ti, TiN, $TiO_x$, Ta, TaN, Ni, NiN, Cr, CrN, NiCr or NiCrN.

20. The material as claimed in claim 1, wherein the material exhibits a selectivity greater than 1.0 and an emissivity of less than 35%.

21. The material as claimed in claim 1, wherein a difference between the sum of thicknesses of the first and second niobium-based functional layers and the silver-based metal functional layer is greater than 1 nm and less than 3 nm.

22. The material as claimed in claim 1, wherein the second niobium-based functional layer is thicker than the first niobium-based functional layer and a difference between a thickness of the second niobium-based functional layer and the first niobium-based functional layer is from 2 nm to 4 nm.

23. A process for the preparation of a material comprising a transparent substrate coated with a stack of thin layers deposited by cathode sputtering, optionally magnetic-field-assisted cathode sputtering, the process comprising the sequence of following stages:

depositing on the transparent substrate at least one functional coating comprising a silver-based metal functional layer exhibiting a thickness of between 2 and 6 nm, optionally at least one blocking layer chosen from metal layers, metal nitride layers, metal oxide layers and metal oxynitride layers of one or more elements chosen from titanium, nickel, chromium and tantalum, a first and second niobium-based functional layers each selected from a niobium-based metal functional layer or from a niobium-based nitride functional layer and each located:

in contact with at least a portion of the silver-based functional layer or separated from at least a portion of the silver-based functional layer by one or more blocking layers, a sum of thicknesses of the one or more blocking layers is less than 5 nm, the silver-based metal functional layer arranged between the first and second niobium-based functional layers, a sum of thicknesses of the first and second niobium-based functional layers, located directly in contact with or separated by a thickness of less than 5 nm from at least a portion of the silver-based functional layer, is between 4 and 20 nm, wherein the niobium-based metal functional layer comprises at least 95.0% by weight of niobium with respect to the weight of the niobium-based metal functional layer and the niobium-based nitride functional layer comprises at least 95% by weight of niobium, with respect to the weight of elements other than nitrogen constituting the niobium-based nitride functional layer, wherein the sum of thicknesses of the first and second niobium-based functional layers is greater than the thickness of the silver-based metal functional layer and the thickness of the second niobium-based functional layer is greater than the thickness of the first niobium-based functional layer, the first niobium-based functional layer being arranged closer to the transparent substrate than the second niobium-based functional layer, and wherein a ratio of the sum of the thicknesses of the first and second niobium-based functional layers to the sum of the thickness of the silver-based metal functional layer of the functional coating is greater than 1 and lower than 4;

depositing a coating based on dielectric materials is deposited above the functional layer, subjecting the substrate thus coated to a heat treatment.

24. A material comprising a transparent substrate coated with a stack of thin layers comprising at least one functional coating comprising:

a silver-based metal functional layer exhibiting a thickness of between 2 and 6 nm, optionally at least one blocking layer chosen from metal layers, metal nitride layers, metal oxide layers and metal oxynitride layers of one or more elements chosen from titanium, nickel, chromium and tantalum, a first and a second niobium-based functional layer each selected from a niobium-based metal functional layer or from a niobium-based nitride functional layer and each separated from at least a portion of the silver-based functional layer by one or more blocking layers, a sum of thicknesses of the one or more blocking layers is less than 5 nm, the silver-based metal functional layer arranged between the first and second niobium-based functional layers, wherein the niobium-based metal functional layer comprises at least 95.0% by weight of niobium with respect to the weight of the niobium-based metal functional layer and the niobium-based nitride functional layer comprises at least 95% by weight of niobium with respect to the weight of elements other than nitrogen constituting the niobium-based nitride functional layer a sum of thicknesses of the first and second niobium-based functional layers separated by a thickness of less than 5 nm from at least a portion of the silver-based functional layer, is between 4 and 20 nm, wherein the sum of thicknesses of the first and second niobium-based functional layers is greater than the thickness of the silver-based metal functional layer and the thickness of the second niobium-based functional layer is greater than the thickness of the first niobium-based functional layer, the first niobium-based functional layer being arranged closer to the transparent substrate than the second niobium-based functional layer, and wherein a ratio of the sum of the thicknesses of the first and second niobium-based functional layers to the sum of the thickness of the silver-based metal functional layer of the functional coating is greater than 1 and lower than 4.

* * * * *